(12) United States Patent
Kim et al.

(10) Patent No.: US 9,199,637 B1
(45) Date of Patent: Dec. 1, 2015

(54) ENGINE AUTOSTOP CONTROL SYSTEM AND METHOD FOR HYBRID POWERTRAIN

(71) Applicant: GM GLOBAL TECHNOLOGY OPERATIONS LLC, Detroit, MI (US)

(72) Inventors: Min-Joong Kim, Troy, MI (US); Lan Wang, Troy, MI (US); Todd Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/281,202

(22) Filed: May 19, 2014

(51) Int. Cl.
| | |
|---|---|
| *B60K 6/52* | (2007.10) |
| *B60K 6/54* | (2007.10) |
| *B60W 20/00* | (2006.01) |
| *F02D 41/12* | (2006.01) |
| *B60W 10/02* | (2006.01) |
| *B60W 10/06* | (2006.01) |
| *B60W 10/08* | (2006.01) |
| *B60W 10/10* | (2012.01) |

(52) U.S. Cl.
CPC .................. *B60W 20/40* (2013.01); *B60K 6/52* (2013.01); *B60K 6/54* (2013.01); *B60W 10/02* (2013.01); *B60W 10/06* (2013.01); *B60W 10/08* (2013.01); *B60W 10/10* (2013.01); *B60W 20/108* (2013.01); *F02D 41/123* (2013.01); *Y10S 903/93* (2013.01)

(58) Field of Classification Search
CPC ............... B60K 6/44; B60K 6/52; B60K 6/54
See application file for complete search history.

(56) References Cited

U.S. PATENT DOCUMENTS

| | | | | |
|---|---|---|---|---|
| 4,923,025 | A * | 5/1990 | Ellers | 180/65.23 |
| 5,301,764 | A * | 4/1994 | Gardner | 180/65.23 |
| 5,789,881 | A * | 8/1998 | Egami et al. | 318/139 |
| 5,988,307 | A * | 11/1999 | Yamada et al. | 180/243 |
| 2002/0094908 | A1* | 7/2002 | Urasawa et al. | 477/3 |
| 2002/0134596 | A1* | 9/2002 | Morimoto et al. | 180/65.2 |
| 2003/0217877 | A1* | 11/2003 | Tatara et al. | 180/65.2 |
| 2005/0090365 | A1* | 4/2005 | Tamai et al. | 477/5 |
| 2008/0099259 | A1* | 5/2008 | Tomo | 180/65.2 |
| 2009/0105924 | A1* | 4/2009 | Kamichi et al. | 701/99 |
| 2010/0273604 | A1* | 10/2010 | Imaseki | 477/5 |

\* cited by examiner

*Primary Examiner* — Frank Vanaman
(74) *Attorney, Agent, or Firm* — Quinn Law Group, PLLC

(57) ABSTRACT

A vehicle includes a first axle, a second axle, an engine having a crankshaft, a transmission having an input member that is operatively connected to the crankshaft and an output member that is operatively connected to the first axle, a first motor having a first rotor operatively connected to the crankshaft, a second motor having a second rotor that is operatively connected to the second axle, and a controller being operatively connected to the engine, the first motor, and the second motor. The controller is configured to selectively cause the engine to enter a deceleration fuel cut off mode, cause the transmission input torque to increase to zero, cause the torque of the second motor to decrease as the transmission input torque increases such that the sum of the first axle torque and the second axle torque remains substantially constant as the transmission input torque increases to zero.

4 Claims, 2 Drawing Sheets

ENGINE AUTOSTOP CONTROL SYSTEM AND METHOD FOR HYBRID POWERTRAIN

TECHNICAL FIELD

This invention relates to hybrid vehicle powertrains.

BACKGROUND

Hybrid powertrains include two sources of torque, typically an internal combustion engine and an electric motor, which are operable in parallel or in series to provide torque to the vehicle's wheels. During certain modes of operation, the engine is turned off and torque is provided solely by the electric motor, which receives electrical energy from a battery. A powertrain control module (i.e., a powertrain controller) may cause the engine to turn off during certain operating conditions such that the powertrain operates with torque only from the electric motor; such an action by the powertrain control module may be called an "engine autostop."

SUMMARY

A vehicle includes a first axle, a second axle, an engine having a crankshaft, a transmission having an input member that is operatively connected to the crankshaft and an output member that is operatively connected to the first axle, a first motor having a first rotor operatively connected to the crankshaft, a second motor having a second rotor that is operatively connected to the second axle, and a controller being operatively connected to the engine, the first motor, and the second motor.

The controller is configured to selectively cause the engine to enter a deceleration fuel cut off mode, cause the transmission input torque to increase to zero, and cause the torque of the second motor to decrease as the transmission input torque increases such that the sum of the first axle torque and the second axle torque remains substantially constant as the transmission input torque increases to zero.

Thus, the second motor provides constant total axle torque during the autostop procedure, which reduces or eliminates any perception of the autostop by a passenger of the vehicle. A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
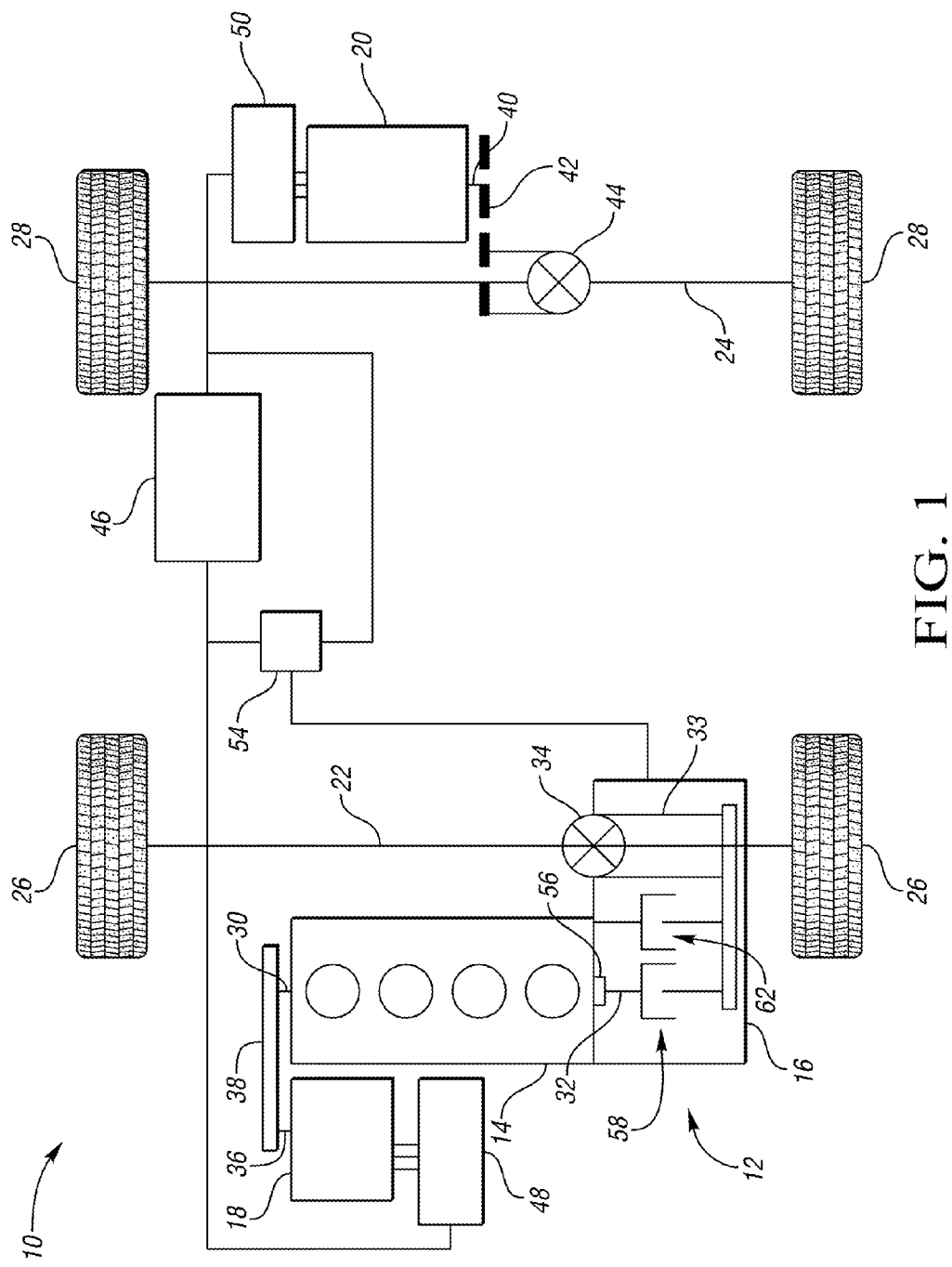
FIG. 1 is a schematic, top view of a vehicle including a hybrid powertrain having an engine and two electric motors.

Referring to FIG. 1, a vehicle 10 includes a powertrain 12. The powertrain 12 includes an internal combustion engine 14, a transmission 16, a first electric motor/generator 18, and a second electric motor/generator 20. The vehicle 10 further includes a front (first) axle 22 and a rear (second) axle 24. Two front wheels 26 are operatively connected to the front axle 22, and two rear wheels 28 are operatively connected to the rear axle.

The engine 14 includes a crankshaft 30 that is operatively connected to an input member 32 of the transmission 16 to transmit torque thereto. The transmission 16 includes an output member 33 operatively connected to a front differential 34 operatively connected to the front wheels 26 via the front axle 22. The transmission 16 is configured to vary the speed ratio between the input member 32 and the output member 33, and transmit torque from the engine 14 and the first motor 18 to the front wheels 26 via the front differential 34 and the front axle 22.

The first motor/generator 18 includes a first rotor 36 that is connected to the crankshaft 30 via a torque transfer device 38, such as a belt drive, chain drive, or gears, and thus the first motor/generator 18 is configured to selectively transfer torque to the crankshaft 30. The second motor/generator 20 includes a second rotor 40 that is operatively connected to a rear differential 44 to transmit torque thereto via gears 42. The rear differential 44 operatively interconnects to the rear axle 24 to the second rotor 40 such that torque is transmissible from the second rotor 40 to the rear wheels 28 via the rear axle 24.

An electrical energy storage device, such as a battery 46, is operatively connected to the first motor generator 18 via a first inverter 48, and the battery 46 is operatively connected to the second motor/generator 20 via a second inverter 50. A controller 54 is operatively connected to the first and second motor/generators 18, 20 and the transmission 16. The controller 54 is configured to control the torque output of the first and second motor/generators 18, 20 and to control the engagement and disengagement of the various clutches and brakes of the transmission 16 to control the speed ratio between the input member 32 and the output member 33. The transmission 16 includes at least three selectively engageable torque transmitting devices 56, 58, 62 that are controllable by the controller 54.

It should be noted that, as used herein, a "controller" may include one or more control units that cooperate to perform the steps described herein. For example, controller 54 may be a single powertrain control unit, or controller 54 may be a transmission control module and an engine control module that are separate but cooperate to perform the steps described herein.

Figure 2:
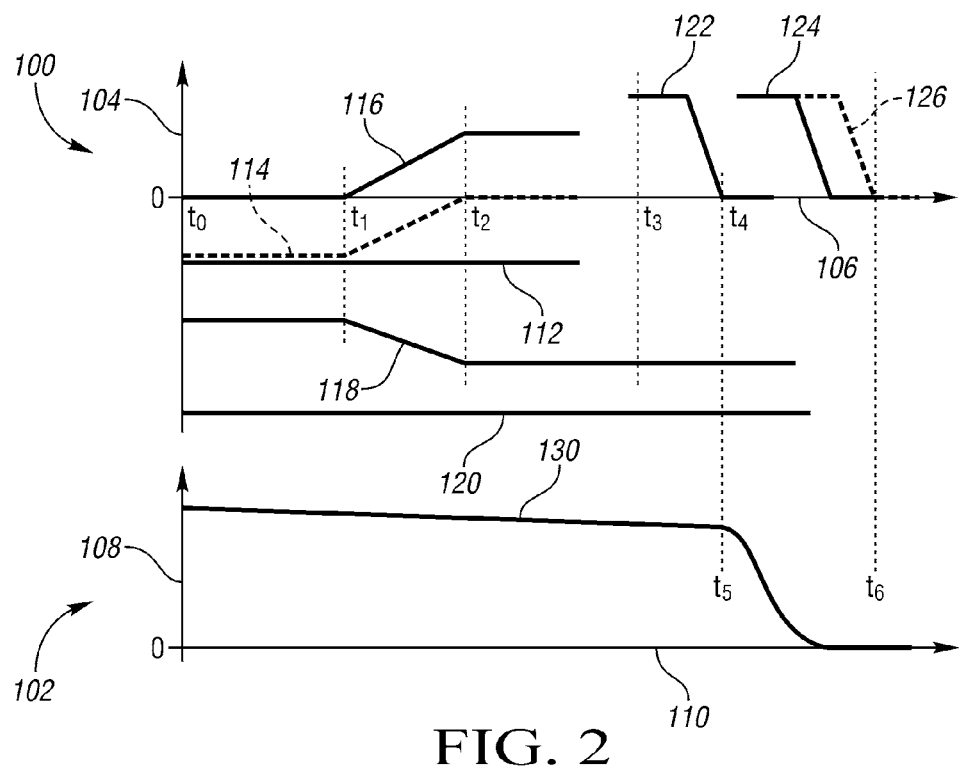
FIG. 2 is a graph depicting a first method of achieving engine autostop in the powertrain of FIG. 1.

Referring to FIG. 2, a first graph 100 depicts torque as a function of time, and a second graph 102 depicts vehicle speed as a function of time. More specifically, vertical axis 104 depicts torque and horizontal axis 106 depicts time. Vertical axis 108 depicts vehicle speed and horizontal axis 110 depicts time. Axes 106 and 110 are substantially identical; that is, any line drawn through and perpendicular to axes 106 and 110 represents the same moment in time.

Line 112 represents engine torque (i.e., at crankshaft 30) during deceleration fuel cut off (DFCO). Line 114 represents transmission input torque (i.e., transmission input member 32). Line 116 represents first motor/generator torque (i.e., the torque at the first rotor 36). Line 118 represents second motor/generator torque (i.e., the torque at the second rotor 40). Line 120 represents total axle torque, i.e., the sum of the torque on the front axle 22 and the torque on the rear axle 24. Line 122 represents a first range clutch capacity. Line 124 represents a second range clutch capacity. Line 126 represents torque converter clutch capacity. Line 130 represents engine speed (i.e., rotation speed of the crankshaft 30).

The graphs of FIG. 2 show a method of achieving autostop for use when clutch 56 is a torque converter clutch, clutch 58 is a first range clutch, and clutch 62 is a second range clutch. The controller 54 is programmed and configured to perform the method shown in the graphs of FIG. 2. More specifically, the method includes the controller detecting that autostop is requested when the driver's request is low or negative (regenerative braking), i.e. electric vehicle mode is desired. In response to detecting that autostop is requested, the controller causes engine torque 112 to be reduced and go into DFCO mode at time $t_0$.

At time $t_1$, the controller 54 decides to stop the engine 14, and uses the first motor torque 116 to make transmission input torque 114 near zero Nm by cancelling out engine torque 112. More specifically, the first motor 18 is connected to the crankshaft 30 by the torque transmitting device 38, and thus the torque transmitted to the input member 32 is the sum of the engine torque 112 and the first motor torque 116. Engine torque 112 during DFCO is negative; the controller 54 uses the first motor torque 116 to make the transmission input torque 114 near zero by causing the first motor 18 to increase torque at time $t_1$ so that the total torque at the input member 32 (i.e., transmission input torque 114) is approximately zero by time $t_2$, as shown in FIG. 2.

Concurrent with causing the first motor 18 to increase torque at time $t_1$, the controller 54 causes the second motor torque 118 to decrease at time $t_1$ to compensate for the increase in first motor torque 116. More specifically, the controller 54 decreases the second motor torque 118 sufficiently to maintain a constant value of total axle torque 120, as shown in FIG. 2.

Once transmission input torque 114 is zero at time $t_2$, the controller 54 causes the release of the first range clutch capacity 122. Instead of the torque converter clutch, a range clutch needs to be released first to make sure the torque converter coasting mode is not involved in autostop. When the first range clutch capacity 122 reaches zero Nm at time $t_4$, the transmission 16 is effectively in neutral state, so engine speed 130 is free to stop (i.e., reach zero) with stop position control.

As the engine speed 130 decreases after time $t_4$, the line pressure naturally drops and the second range clutch capacity 124 and the torque converter clutch capacity 126 will be released. Autostop is achieved at time $t_6$.

Figure 3:
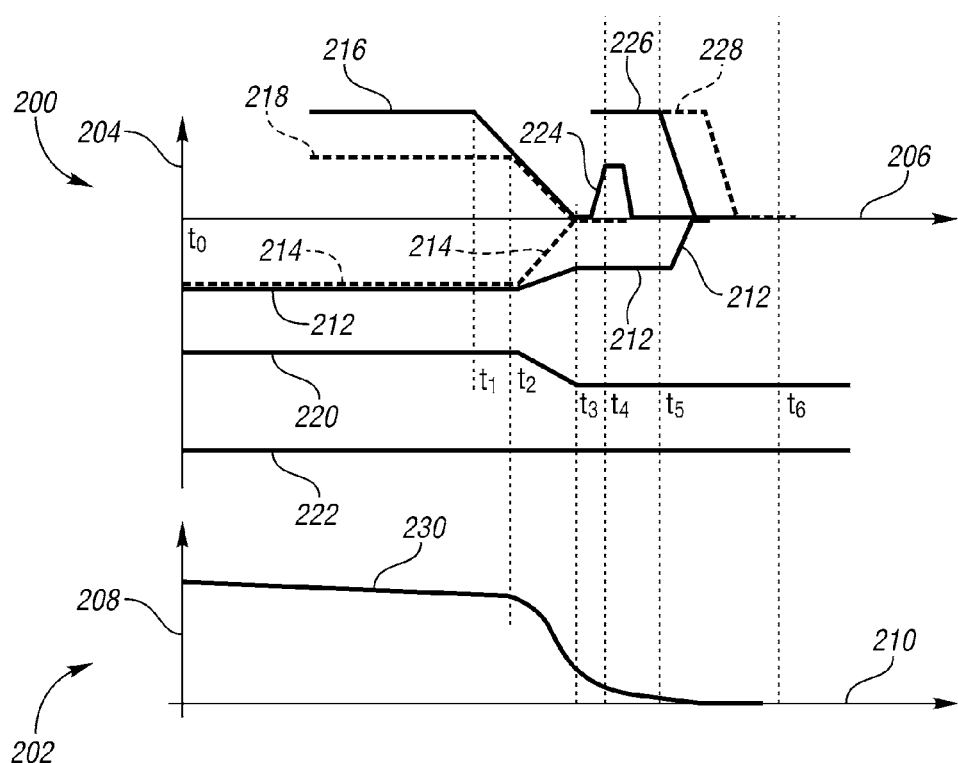
FIG. 3 is a graph depicting a second method of achieving engine autostop in the powertrain of FIG. 1.

Referring to FIG. 3, a first graph 200 depicts torque as a function of time, and a second graph 202 depicts vehicle speed as a function of time. More specifically, vertical axis 204 depicts torque and horizontal axis 206 depicts time. Vertical axis 208 depicts vehicle speed and horizontal axis 210 depicts time. Axes 206 and 210 are substantially identical; that is, any line drawn through and perpendicular to axes 206 and 210 represents the same moment in time.

The graphs of FIG. 3 show another method of achieving autostop for use when clutch 56 is a torque converter clutch, clutch 58 is an offgoing clutch, and clutch 62 is a second offgoing clutch. The controller 54 is programmed and configured to perform the method shown in the graphs of FIG. 3.

Line 212 represents engine torque (i.e., at crankshaft 30) during deceleration fuel cut off (DFCO). Line 214 represents transmission input torque (i.e., transmission input member 32). Line 216 represents a first offgoing clutch capacity (i.e., of first offgoing clutch 58). Line 218 represents the reaction torque of the first offgoing clutch 58. Line 220 represents second motor/generator torque (i.e., the torque at the second rotor 40). Line 222 represents total axle torque, i.e., the sum of the torque on the front axle 22 and the torque on the rear axle 24. Line 224 represents first motor/generator torque (i.e., the torque at the first rotor 36). Line 226 represents a second offgoing clutch capacity (i.e. offgoing clutch 62). Line 228 represents torque converter clutch capacity. Line 230 represents engine speed (i.e., rotation speed of the crankshaft 30).

More specifically, the method includes the controller detecting that autostop is requested when the driver's request is low or negative (regenerative braking), i.e. electric vehicle mode is desired. In response to detecting that autostop is requested, the controller causes engine torque 112 to be reduced and go into DFCO mode at time $t_0$.

At time $t_1$, the controller 54 decides to stop the engine, and reduces the first off-going clutch capacity 216. At time $t_2$, the first offgoing clutch capacity 216 becomes lower than the reaction torque 218, and the inertia phase starts.

During the inertia phase (between time $t_2$ and time $t_3$), the engine speed 230 decreases and transmission input torque 214 reaches zero. Meanwhile, controller 54 causes the second motor torque 220 to decrease so that the total axle torque 222 remains constant. At time $t_3$, the transmission input torque 214 reaches zero, and the transmission 16 is effectively in neutral state.

At time $t_4$, when engine speed 230 reaches a threshold speed (e.g., 200RPM), the controller 54 causes the first motor torque 224 to activate (i.e., increase from zero) to do engine stop position control. As the engine speed 230 further decreases, the line pressure naturally drops and the other range clutch capacity 226 and the torque converter clutch capacity 228 will be released beginning at time $t_5$. Autostop is achieved at time $t_6$.

Thus, in the methods of both FIGS. 2 and 3, the controller 54 causes the transmission input member torque to increase to zero, and concurrently decreases the torque of the second motor 20 to maintain constant total axle torque and compensate for the increase in torque at the transmission input member 32 and, correspondingly, at the front axle 22 because the transmission 16 is not yet in neutral and thus the increase in torque at the transmission input member 32 is transmitted to the front axle 22. However, the methods of FIGS. 2 and 3 vary in how the increase in transmission input torque is achieved. In FIG. 2, the increase in transmission input torque is achieved by the first motor increasing torque, whereas in FIG. 3 the increase in transmission input torque is achieved by releasing an offgoing clutch so that engine speed decreases as the crankshaft 30 is no longer mechanically connected to the driving wheels 26.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a first axle;
a second axle;
an engine having a crankshaft;
a transmission having an input member that is operatively connected to the crankshaft and an output member that is operatively connected to the first axle, wherein the transmission includes a range clutch;
a first motor having a first rotor operatively connected to the crankshaft;
a second motor having a second rotor that is operatively connected to the second axle;
a controller being operatively connected to the engine, the first motor, and the second motor and configured to selectively control the engine, the first motor, and the second motor;
wherein the controller is configured to:

selectively cause the engine to enter a deceleration fuel cut off mode in which the engine torque is negative;

command the first motor to increase a first motor torque thereof in order to cause the transmission input torque to increase to zero;

command the second motor to decrease a second motor torque thereof at the same time as the transmission input torque increases such that the sum of the first axle torque and the second axle torque remains substantially constant as the transmission input torque increases to zero; and release the range clutch when the transmission input torque reaches zero such that the transmission is in a neutral state and the engine crankshaft is free to stop.

2. The vehicle of claim 1, wherein the controller is configured to activate the first motor to effectuate engine stop position control after the transmission input torque reaches zero.

3. A method for a vehicle having a first axle, a second axle, an engine having a crankshaft, a transmission having an input member that is operatively connected to the crankshaft, an output member that is operatively connected to the first axle and a range clutch, a first motor having a first rotor operatively connected to the crankshaft, and a second motor having a second rotor that is operatively connected to the second axle, the method comprising:

causing the engine to enter a deceleration fuel cut off mode in which the engine torque is negative;

increasing a first motor torque of the first motor in order to cause the transmission input torque to increase to zero;

decreasing a second motor torque of the second motor at the same time as the transmission input torque increases such that the sum of the first axle torque and the second axle torque remains substantially constant as the transmission input torque increases to zero; and releasing the range clutch when the transmission input torque reaches zero such that the transmission is in a neutral state and the engine crankshaft is free to stop.

4. The method of claim 3, further comprising activating the first motor to effectuate engine stop position control after the transmission input torque reaches zero.

* * * * *